June 30, 1953   W. F. GINSBERG   2,644,152
TRAFFIC WARNING SIGNAL
Filed March 16, 1950   2 Sheets-Sheet 1
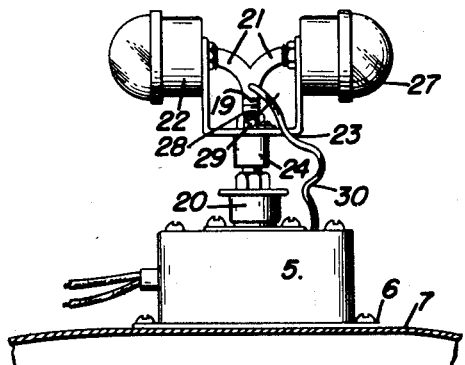
Fig. 1
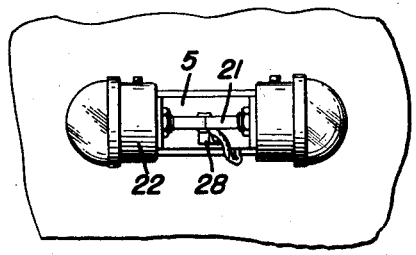
Fig. 2
Fig. 8
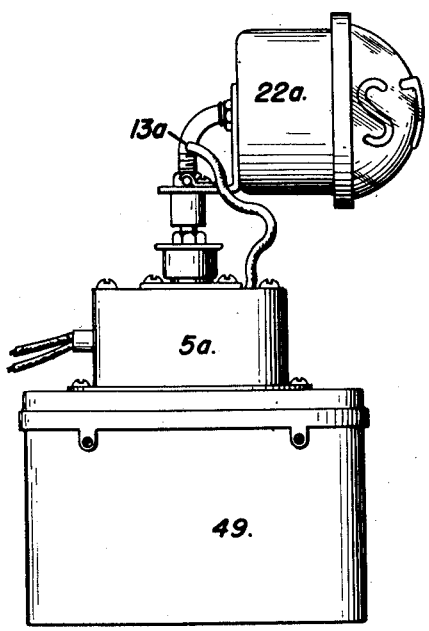
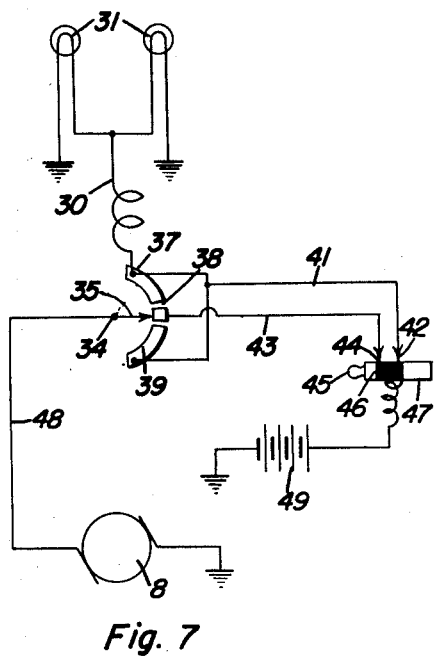
Fig. 7
Walter F. Ginsberg
INVENTOR.
BY
Attorneys

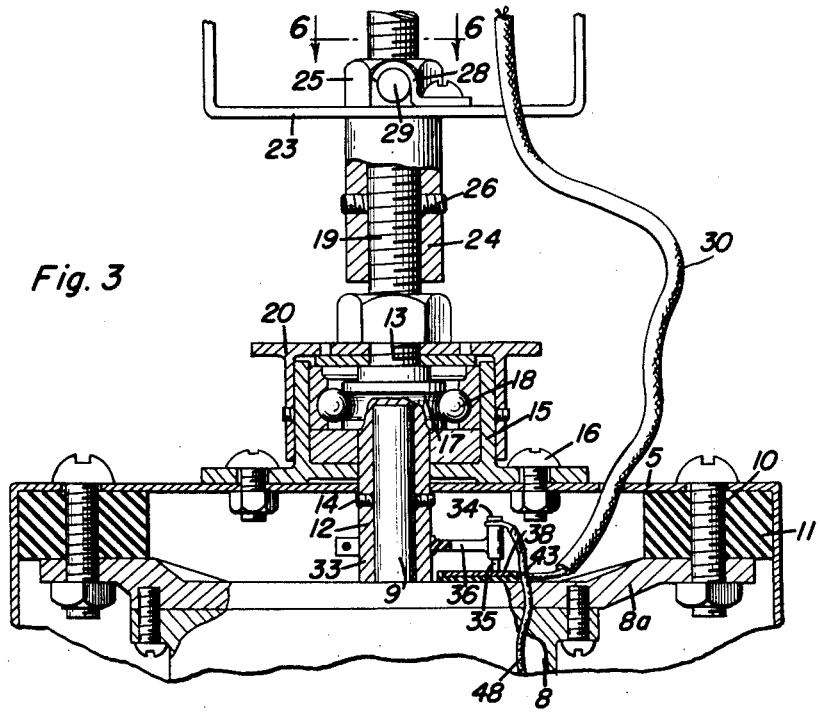
Fig. 3
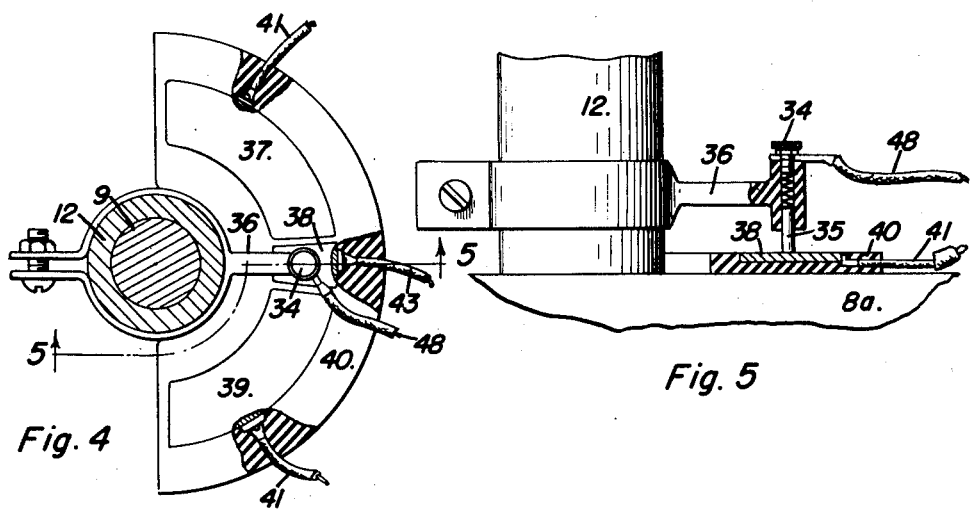
Fig. 4
Fig. 5
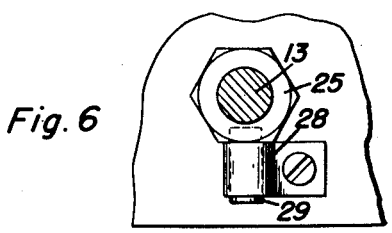
Fig. 6
Walter F. Ginsberg
INVENTOR.

Patented June 30, 1953

2,644,152

UNITED STATES PATENT OFFICE 2,644,152

TRAFFIC WARNING SIGNAL

Walter F. Ginsberg, Anaconda, Mont.

Application March 16, 1950, Serial No. 149,958

4 Claims. (Cl. 340—366)

The present invention relates to new and useful improvements in highway warning signals and more particularly to an oscillating signal which may be mounted on a vehicle or used independently of the vehicle as a self-contained portable traffic warning signal.

An important object of the invention is to provide a warning signal having an oscillating lamp operated by an electric motor and providing a flashing contact for the lamp and with separate control means for energizing the lamp and for operating the motor to use the signal either with or without an oscillating movement.

A further object is to provide a warning signal of simple, practical and compact construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the warning signal mounted on top of a motor vehicle;

Figure 2 is a top plan view;

Figure 3 is an enlarged fragmentary vertical sectional view of the oscillating shaft for the lamp;

Figure 4 is an enlarged top plan view of the conductor plates for the oscillating contact;

Figure 5 is a sectional view taken on a line 5—5 of Figure 4;

Figure 6 is a sectional view taken on a line 6—6 of Figure 3;

Figure 7 is a diagram of the electric circuit for the lamp and motor; and

Figure 8 is a side elevational view of a portable signal.

Referring now to the drawings in detail, wherein, for the purpose of illustration, I have disclosed a preferred embodiment of my invention, the numeral 5 designates a motor housing having an attaching flange 6 at its lower edge for attaching to the top 7 of a motor vehicle.

An electric motor 8 of a conventional type such as commonly used for oscillating windshield wiper blades, is employed for oscillating shaft 9 of the motor which is mounted in housing 5 by means of a hanger plate 8a secured to the under side of the housing by bolts and nuts 10 and with rubber cushions or spacers 11 between the plate and the housing, and shaft 9 extends upwardly in a hollow lower end 12 of a shaft 13 secured to the shaft 9 by set screws 14. Shaft 13 extends upwardly into the bottom of a bearing housing 15 secured on top of motor housing 5 by bolts and nuts 16, the sleeve being formed with a grooved ball bearing race 17 for a ball bearing assembly 18 in the bearing housing.

Shaft 13 rises from race 17 through a cap 20 secured on top of bearing housing 17 and is threaded, as at 19, at its upper end and formed with diverging hollow arms 21 projecting horizontally at its upper end and secured to the rear of a pair of horizontal lamp housings 22. A bracket 23 is also attached to the rear of the lamp housings and is secured on top of a sleeve 24 by a nut 25 threaded on shaft 13, the sleeve 24 also being secured to shaft 13 by set screws 26. A lens 27 is mounted on front of each lamp housing to face in opposite directions from each other and may be suitably colored.

Bracket 23 is held from turning on shaft 13 by a clip 28 secured to the bracket and engaging a pin 29 projecting horizontally from nut 25.

A bracket 36 is clamped to lower end 12 of shaft 13 and in which a carbon brush 35 or other suitable contact is supported in a vertical position in wiping engagement with a group of three conductor plates 37, 38, and 39. The conductor plates include a pair of arcuate end plates 37 and 39 and a relatively short center plate 38, all of the plates being mounted in an arcuate path on an insulation sheet 40 secured to hanger plate 8a.

The upper end of brush 35 is provided with a terminal 34 to which a circuit wire 48 is attached leading to motor 8.

A circuit wire 30 connects the lamps 31 in housings 22 with the end conductor plates 37 and 39 and a wire 41 leads from plates 37 and 39 to a stationary contact 42 while a wire 43 leads from center plate 38 to a second stationary contact 44. A sliding push and pull switch 45 is formed with an insulated front end 46 and a conductor band 47 at its rear end connected to the battery 49 of the electric system of the vehicle on which the signal is mounted. Conductor band 47 is held out of contact with both contacts 42 and 44 when switch 45 is pushed inwardly or toward the right, as shown in Figure 7, to cut off the circuit for lamps 31 as well as for the motor 8, and switch 45 closes the circuit with contact 42 for energizing lamps 31 upon an initial outward movement of the switch and closes the circuit with motor 8, while the circuit for the lamps remain closed, upon a subsequent outward movement of the switch.

In Figure 8, I have illustrated a portable warning signal in which the motor housing 5a is mounted on top of a battery case 49 for operating the signal by a battery (not shown) in the battery case, to provide a self-contained portable warning signal.

A modified oscillating shaft 13a is also shown in Figure 8 for a single lamp housing 22a and which may be substituted for the double lamps 22, if desired, the construction of the device being otherwise similar to that illustrated in Figures 1 to 7, inclusive.

In either form of the invention, switch 45 is pulled outwardly to slide conductor band 47 into circuit closing position with contacts 42 and 44 to energize lamps 31 as well as to energize motor 8 and motor 8 oscillates shafts 9 and 13 to swing lamp housings from side to side while the lamps remain energized.

When a stationary signal is desired, motor 8 is cut off by moving switch 45 inwardly until conductor band 47 breaks the circuit at contact 44, cutting off center plate 38, while contact 42 remains engaged with band 47 to retain the lamps energized and the engagement of contact 35 with plates 37 and 39 continues to rotate shaft 13 until contact 35 reaches dead plate 32 to cut off the motor and the shaft 13 and lamps 22 then remain stationary and with the lamps pointing in a predetermined direction.

In view of the foregoing description taken in connection with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A traffic warning signal comprising a motor having an oscillating shaft, a lamp operatively connected to said shaft for swinging movement thereby, a plurality of conductor plates mounted on a supporting structure in co-planar spaced apart relation from each other, circuit means electrically connecting each of said conductor plates to a source of power, a contact connected to the lamp and supported by the shaft for swinging movement thereby in wiping engagement with the plates, means electrically connecting said contact to said motor, and a switch connected in said circuit means leading to said plates for selectively cutting off at least one of the plates to stop said motor and to deactuate the shaft for holding the lamp facing in a predetermined direction when said contact engages said one of said plates.

2. A traffic warning signal comprising a motor housing, a motor in the housing, an oscillating shaft driven by the motor and rising from the housing, a lamp supported at the top of the shaft for horizontal swinging movement, a plurality of conductor plates secured in the housing in co-planar spaced apart relation from each other and connected in individual circuits to a source of power, a contact connected to the motor and supported by the shaft for oscillating movement therewith in wiping engagement with the plates, and switch means for said circuits for selectively cutting on and off the circuit for at least one of the plates to stop said motor and to deactuate the shaft for holding the lamp facing in a predetermined direction when said contact engages said one of said plates while maintaining the circuit for the lamp closed.

3. In a traffic warning signal, a motor housing, a motor mounting plate secured to the under side of the top of the housing in spaced relation therefrom for supporting an oscillating motor in the housing, a vertical shaft having its lower end secured to the shaft of the motor, a lamp supported at the upper end of the shaft for horizontal swinging movement, a contact connected to the motor and supported by the shaft at a position within the motor housing for horizontal swinging movement by the shaft, a plurality of conductor plates supported in a fixed position on the motor mounting plate in wiping engagement by the contact, said plates being individually connected in a circuit with a power source, and switch means controlling the circuit to one of said plates to selectively cut on and off the motor when said contact engages said one of said plates while the lamp remains energized.

4. The combination of claim 3 wherein said last-mentioned switch means is actuatable to de-energize said lamp.

WALTER F. GINSBERG.

References Cited in the file of this patent

UNITED STATES PATENTS

| Number | Name | Date |
| --- | --- | --- |
| 1,787,382 | Jones | Dec. 30, 1930 |
| 1,895,669 | Kolsters | Jan. 31, 1933 |
| 2,235,181 | Thiel | Mar. 18, 1941 |
| 2,417,934 | Kennelly | Mar. 25, 1947 |
| 2,460,585 | Kennelly | Feb. 1, 1949 |
| 2,508,071 | Martin et al. | May 16, 1950 |